(12) United States Patent
Campbell

(10) Patent No.: US 10,259,383 B1
(45) Date of Patent: Apr. 16, 2019

(54) REAR COLLISION ALERT SYSTEM

(71) Applicant: Ambarella, Inc., Santa Clara, CA (US)

(72) Inventor: Jeffery Campbell, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 84 days.

(21) Appl. No.: 15/373,876

(22) Filed: Dec. 9, 2016

(51) Int. Cl.
  *H04N 5/247* (2006.01)
  *B60Q 1/52* (2006.01)
  *B60Q 1/46* (2006.01)

(52) U.S. Cl.
  CPC ............ *B60Q 1/525* (2013.01); *B60Q 1/46* (2013.01); *H04N 5/247* (2013.01)

(58) Field of Classification Search
  None
  See application file for complete search history.

(56) References Cited

U.S. PATENT DOCUMENTS

| | | | | |
|---|---|---|---|---|
| 2012/0041632 | A1* | 2/2012 | Garcia Bordes | B60W 30/0953 701/29.1 |
| 2013/0321627 | A1* | 12/2013 | Turn, Jr. | B60W 30/00 348/148 |
| 2014/0309884 | A1* | 10/2014 | Wolf | B60T 8/17 701/41 |
| 2015/0360619 | A1* | 12/2015 | Barthel | B60R 11/04 348/148 |
| 2017/0072850 | A1* | 3/2017 | Curtis | B60W 50/0097 |
| 2017/0324863 | A1* | 11/2017 | Lockenour | H04M 3/06 |
| 2017/0371339 | A1* | 12/2017 | Charette | B60W 50/14 |

* cited by examiner

*Primary Examiner* — Eileen M Adams
(74) *Attorney, Agent, or Firm* — Christopher P. Maiorana, PC

(57) ABSTRACT

An apparatus comprising a sensor and a processor. The sensor may be configured to capture video frames of an environment near a vehicle. The processor may be configured to (i) receive the video frames from the sensor, (ii) perform video analytics on the video frames and (iii) generate a control signal in response to the video analytics. The video analytics may analyze visual content in the video frames to identify an object approaching the vehicle. The video analytics may determine an expected path of the object approaching the vehicle. The control signal may be configured to generate a warning for the object approaching the vehicle if the expected path poses a collision hazard with the vehicle.

18 Claims, 8 Drawing Sheets

REAR COLLISION ALERT SYSTEM

FIELD OF THE INVENTION

The invention relates to video capture generally and, more particularly, to a method and/or apparatus for implementing a rear collision alert system.

BACKGROUND

Slow-moving or stationary vehicles on a roadway are at risk of being struck from behind when traffic conditions are such that other vehicles traveling in the same direction are moving at faster speeds. Drivers approaching a slow-moving or stationary vehicle might not expect to need to brake quickly, might misjudge speed differences, or might not notice the vehicle ahead. One common scenario is a nighttime, left hand turn from a busy thoroughfare to a residential street where no traffic light is present. The left hand turn may be delayed by oncoming traffic and the vehicle may be stationary while waiting to turn. The stationary vehicle can be at risk of being struck by fast moving vehicles approaching from behind.

Experienced drivers might attempt to alert other drivers approaching from behind that the vehicle the driver is piloting has stopped or has reduced speed with a visual indication using brake lights located at the tail of the vehicle in front. One common practice for vigilant drivers is to "pump" or rapidly release and depress the brake pedal to toggle the tail brake lights and therefore make them more conspicuous to alert the driver of the oncoming vehicle to take action. However, in the left hand turn scenario, the driver of the stationary vehicle in front might not be aware of vehicles approaching from behind. Often drivers making a left hand turn are focused on the oncoming traffic in order to safely complete the turn.

It would be desirable to implement a rear collision alert system.

SUMMARY

The invention concerns an apparatus comprising a sensor and a processor. The sensor may be configured to capture video frames of an environment near a vehicle. The processor may be configured to (i) receive the video frames from the sensor, (ii) perform video analytics on the video frames and (iii) generate a control signal in response to the video analytics. The video analytics may analyze visual content in the video frames to identify an object approaching the vehicle. The video analytics may determine an expected path of the object approaching the vehicle. The control signal may be configured to generate a warning for the object approaching the vehicle if the expected path poses a collision hazard with the vehicle.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a rear collision alert system that may (i) prevent collisions, (ii) warn other drivers of a slow-moving and/or stationary vehicle, (iii) interface with components of a vehicle to generate a warning, (iv) alert a driver of an imminent collision, (v) implement video analytics to determine an expected path of oncoming vehicles and/or (vi) be implemented as one or more integrated circuits.

Figure 1:
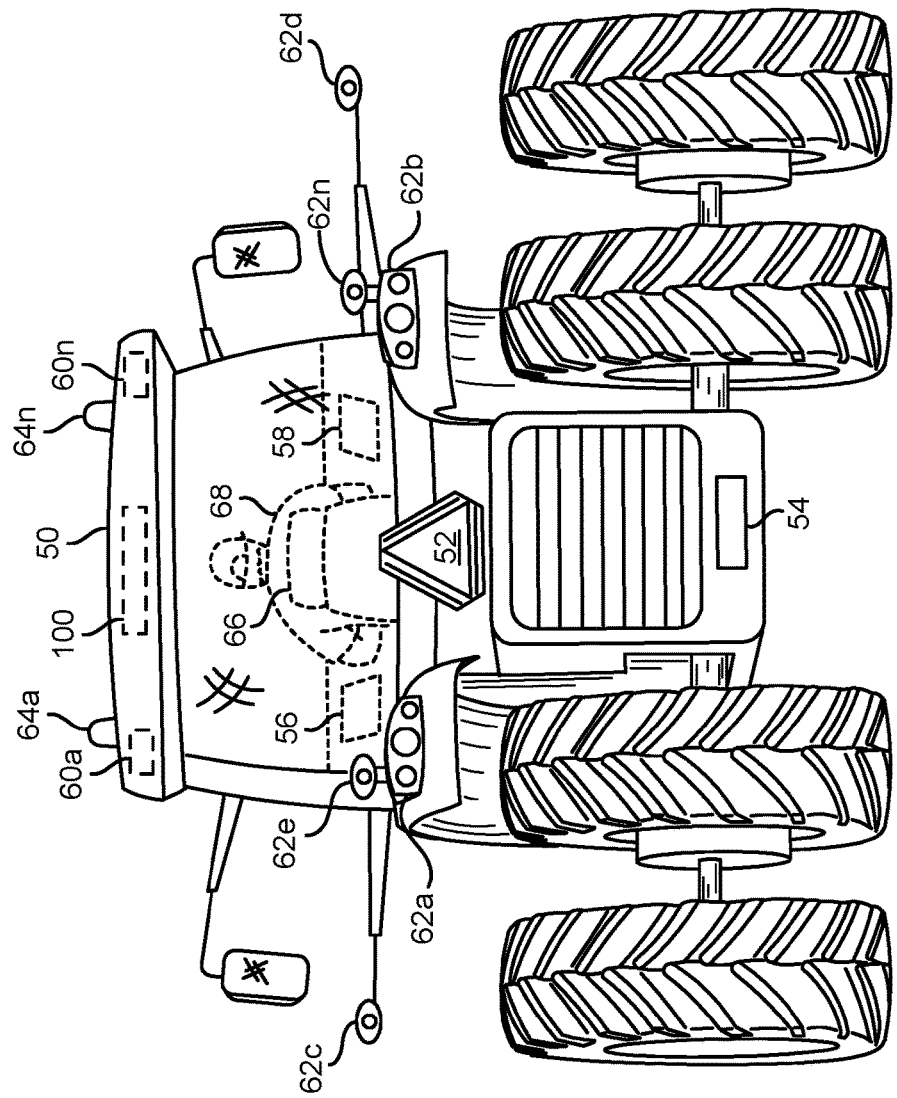
FIG. 1 is a diagram illustrating an example embodiment of the invention.

Referring to FIG. 1, a diagram illustrating an example embodiment of the invention is shown. An apparatus 100 is shown. The apparatus 100 may be implemented in (or on) a vehicle 50. The vehicle 50 may be a slow-moving vehicle and/or a stationary vehicle. In the example shown, the vehicle 50 may be a tractor. The vehicle 50 is shown displaying the slow-moving vehicle sign 52. In another example, the slow-moving may be traveling at a speed in accordance with posted speed limits and another vehicle may be speeding (e.g., the vehicle 50 is traveling at a normal speed, but is slow-moving with respect to another vehicle).

The vehicle 50 may implement various components. The apparatus 100 may be configured to interface and/or communicate with the various components of the vehicle 50. The various components of the vehicle 50 may comprise a block (or circuit) 54, an onboard safety component 56, a block (or circuit) 58, a blocks (or circuits) 60a-60n, tail lights 62a-62n, warning lights 64a-64n and/or a seat 66. A driver 68 of the vehicle 50 is shown in the seat 66. The number and/or types of components of the vehicle 50 may be varied according to the design criteria of a particular implementation.

The circuit 54 may be an audio output device. In one example, the audio output device 54 may be a speaker located on an exterior of the vehicle 50. In the example shown, the audio output device 54 may be directed towards a rear of the vehicle 50. In another example, the audio output device 54 may be a horn of the vehicle 50. The audio output device 54 may be configured to generate audio. The audio generated by the audio output device 54 may be implemented as a warning to other drivers and/or pedestrians. For example, the audio output device 54 may be configured to alert others of the presence of the vehicle 50. The location, implementation, audio level and/or tone of the audio output device 54 may be varied according to the design criteria of a particular implementation.

The onboard safety component 56 is shown as a representative example for various onboard safety components implemented by the vehicle 50. In one example, the onboard safety component 56 may be an airbag system. In another example, the onboard safety component 56 may be a seatbelt restraint system. In yet another example, the onboard safety component 56 may be a driver assistance module configured to autonomously perform evasive driving maneuvers. The implementation of the onboard safety component 56 may be varied according to the design criteria of a particular implementation.

The circuit 58 may be configured as a display device. In one example, the display device may be a LCD (or LED or OLED) screen. In another example, the display device may be a touchscreen display. The display device 58 may be the infotainment unit of the vehicle 50. The display device 58 may be configured to display images and/or video to the driver 68.

The circuits 60a-60n may be configured as cameras and/or camera lenses. The camera lenses 60a-60n may be directed to capture images of the environment near the vehicle 50. In one example, the lens 60a may be implemented as a rear-facing camera lens directed to capture a view to the rear of the vehicle 50. In some embodiments, the lenses 60a-60n may be a component of the vehicle 50 (e.g., a back-up camera). In some embodiments, the lenses 60a-60n may be installed as an after-market part for the vehicle 50 (e.g., a dashboard camera). In some embodiments, the lenses 60a-60n may be implemented as one or more wide angle (or fisheye) lenses. In some embodiments, the lenses 60a-60n may be implemented as components of a multi-sensor camera. The number, type, direction and/or location of the lenses 60a-60n may be varied according to the design criteria of a particular implementation.

The tail lights 62a-62n may be configured to emit light from the rear of the vehicle 50. The tail lights 62a-62n may be implemented as braking lights to warn drivers behind the vehicle 50 that the vehicle 50 has applied the brakes (e.g., is slowing down and/or stopping). The tail lights 62a-62n may be toggled on/off (e.g., pulsed) to implement turn signals. Generally, the tail lights 62a-62n may be implemented to provide a warning to drivers behind the vehicle 50. For example, the tail lights 62a-62n may make the vehicle 50 more visible (e.g., at night, in heavy rain, when snow is falling and/or in foggy conditions).

The warning lights 64a-64n are shown on the roof of the vehicle 50. The warning lights 64a-64n may be implemented as colored and/or strobe lights. In some embodiments, the warning lights 64a-64n may be police lights and/or emergency vehicle (e.g., ambulance, fire truck, etc.) lights. Generally, the warning lights 64a-64n may be implemented to warn other drivers and/or pedestrians of the vehicle 50.

The seat 66 may be an illustrative example of a component of the vehicle 50 configured to provide haptic feedback. For example, the seat 66 may be configured to vibrate to provide feedback to the driver 68. Other components of the vehicle 50 may be configured to provide haptic feedback. In one example, the steering wheel may provide haptic feedback to the hands of the driver 68.

The apparatus 100 may be configured to receive video frames from one or more of the lenses (or cameras) 60a-60n. The lenses 60a-60n may be configured to capture the environment near the vehicle 50. The apparatus 100 may configured to implement a rear collision alert system. To generate rear collision alerts, the environment near the vehicle 50 may be monitored by the apparatus 100. In one example, the lenses 60a-60n may be rear facing camera(s) placed at the rear of the vehicle 50 to monitor the environment to the rear of the vehicle 50.

In some embodiments, the apparatus 100 may be a component of a camera. In some embodiments, the apparatus 100 may be a component of the vehicle 50. The apparatus 100 may be a processor and/or a system on chip (SoC). For example, the apparatus 100 may be implemented as a printed circuit board comprising one or more components. The apparatus 100 may be configured to encode video frames captured by sensors receiving light from the lenses 60a-60n. In some embodiments, the apparatus 100 may be configured to perform video stitching operations to stitch video frames captured by each of the lenses 60a-60n to capture a wide angle view and/or a multi-camera view. In some embodiments, the apparatus 100 may be configured to perform de-warping operations to correct distortion of the video frames caused by the lenses 60a-60n. The apparatus 100 may format (or encode, or compress, or crop) the video signals to enable wireless transmission, output to the display device 58 and/or local storage of video data.

The apparatus 100 may be configured to identify other vehicles approaching the vehicle 50 from behind that pose a risk of colliding into the tail (e.g., rear) of the vehicle 50 in front. The camera(s) comprising the lenses 60a-60n may feed visual data to a connected and/or embedded processor (e.g., to be described in more detail in association with FIG. 3). The processor of the apparatus 100 may be configured to perform video analytics on the video frames. The video analytics may detect (or identify or recognize) objects in the video frames. In an example, the apparatus 100 may implement the video analytics to calculate the speed of the incoming object and/or rate of decrease in speed (if any). The apparatus 100 may be configured to determine an expected path of the object and/or whether the object poses a collision hazard.

The apparatus 100 may be configured to generate a control signal. The control signal may be configured to generate a warning for the detected object. Generally, the warning may be implemented to alert a driver of an incoming vehicle about a potential collision with the vehicle 50. The warning generated in response to the control signal may be implemented by one or more components of the vehicle 50. In one example, the control signal may activate the brake tail light system (e.g., the lights 62a-62n) to flash (or blink) as the warning. The blinking brake lights 62a-62n may warn the driver approaching the vehicle 50 of a potential collision.

The apparatus 100 may be augmented using various components of the vehicle 50 and/or other add-on components (e.g., after-market components). In one example, the components of the vehicle 50 may be the additional lights 64a-64b (e.g., lights other than the brake lights 62a-62n) that target the incoming driver to alert of an impending collision. The components of the vehicle 50 may comprise the audio output device 54. For example, the audio output device 54 may be integrated as a rear directed speaker that may be activated as an alert. Generally, the components of the vehicle 50 may be used as the warning to motivate the incoming driver to engage a braking system and/or take some other corrective action.

The apparatus 100 may be configured to alert the driver 68 of the vehicle 50 under threat of a collision. In one example, the apparatus 100 may be configured to generate an alert using a visual cue. The visual cue may be output to the display 58 (e.g., to alert the driver 68). In another example, the apparatus 100 may be configured to generate an alert using an auditory cue. The auditory cue may be output using the vehicle audio system (e.g., the radio, the infotainment system, etc.). In yet another example, the apparatus 100 may be configured to generate an alert using a haptic cue. The haptic cue may be a vibration of the car seat 66.

The alert may be implemented to provide the driver 68 with a warning to take evasive action to avoid an impact. In one example, the driver may attempt an evasive maneuver using the vehicle 50. In another example, the vehicle 50 may be too slow to perform an evasive maneuver and the evasive action taken by the driver 68 may be to escape the vehicle 50. In yet another example, if the vehicle 50 is configured to drive autonomously, the alert by the apparatus 100 may be configured to initiate autonomous driving to avoid the collision.

The apparatus 100 may be configured to present the control signal to activate and/or initiate onboard safety devices 56 implemented by the vehicle 50. In one example, the onboard safety devices 56 may comprise an airbag. In another example, the onboard safety devices 56 may comprise a seat belt restraint system. When the apparatus 100 determines that an impact may be imminent, the apparatus 100 may generate the control signal to activate and/or initiate one or more of the onboard safety devices 56. For example, by initiating the onboard safety devices 56, the safety features implemented may be enhanced and/or augmented (e.g., providing additional activation time).

Figure 2:
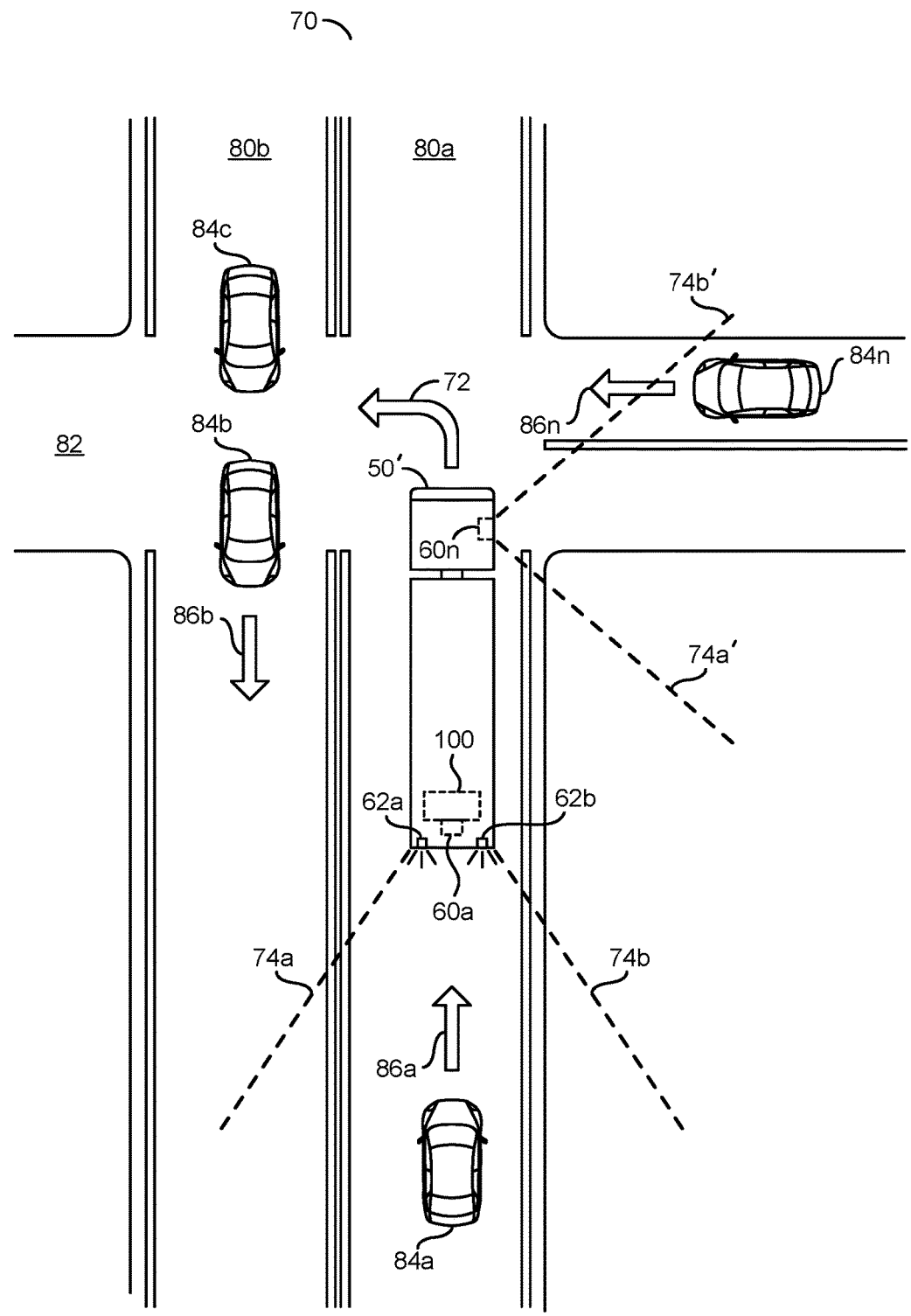
FIG. 2 is a diagram illustrating an example of a warning in a left hand turn scenario.

Referring to FIG. 2, a diagram illustrating an example of a warning in a left hand turn scenario 70 is shown. In the left hand turn scenario 70, the slow-moving vehicle 50' is shown as a transport truck. In the left hand turn scenario 70, the vehicle 50' may be waiting to make a left hand turn 72. The apparatus 100 may be implemented in the vehicle 50'. The lens 60a and the lens 60n are shown on the vehicle 50'. The tail lights 62a-62b are shown emitting light indicating that the brakes are being held as the vehicle 50' waits to make a turn. Lines 74a-74b may represent a field of view of the lens 60a. Lines 74a'-74b' may represent a field of view of the lens 60n. For example, one or more of the lenses 60a-60n may be capturing the environment near the vehicle 50'. The field of view 74a-74b and/or the field of view 74a'-74b' may be the environment captured by one or more of the lenses 60a-60n.

The example left hand turn scenario 70 may comprise a lane 80a and an oncoming lane 80b. An intersecting road 82 may intersect with the lanes 80a-80b. For example, the lanes 80a-80b may be the lanes of a higher traffic road, and the intersecting road 82 may be a lower traffic (e.g., residential) road. Vehicles 84a-84n may be driving in the lanes 80a-80b and/or the intersecting road 82. Arrows 86a-86n are shown to indicate a direction of travel for the respective vehicles 84a-84n.

In the example left hand turn scenario 70, the vehicle 50' may be stopped in the lane 80a, waiting to make the left hand turn 72 onto the intersecting road 82. The vehicles 84b-84c are shown in the oncoming lane 80b traveling in the direction 86b. For example, the vehicle 50' may be blocked from making the left hand turn 72 onto the intersecting road 82 by the vehicles 84b-84c. The vehicle 84a may be in the lane 80a. The vehicle 84a is shown traveling behind the vehicle 50' and in the direction 86a (e.g., approaching the vehicle 50' from behind). For example, the vehicle 84a may be a vehicle approaching the vehicle 50' from the rear. The approaching vehicle 84a may need to stop, slow down and/or move around the vehicle 50' to avoid a collision with the vehicle 50'.

In the example left hand turn scenario 70, the approaching vehicle 84a may be within the field of view 74a-74b of one or more of the camera lenses 60a-60n. The apparatus 100 may perform the video analytics to determine the expected path of the approaching vehicle 84a. If the approaching vehicle 84a poses a collision hazard, the apparatus 100 may generate a control signal. For example, the control signal may activate and/or blink the tail lights 62a-62b. The blinking tail lights 62a-62b may be the warning for the vehicle 84a behind the vehicle 50'.

Similarly, the apparatus 100 may be configured to detect collision hazards to a side and/or front of the vehicle 50'. In the example shown, the lens 60n is shown capturing the environment (e.g., the field of view 74a'-74b') on the passenger side of the vehicle 50'. The vehicle 84n is shown on the intersecting road 82 traveling towards the intersection in the direction 86n. In an example, the intersecting road 82 may have a stoplight at the intersection with the lanes 80a-80b. If the driver of the vehicle 84n does not stop at the intersection (e.g., during a red stoplight), the vehicle 84n may pose a side-collision (e.g., a T-bone collision) hazard with the vehicle 50' (e.g., the vehicle 50' may have a green stoplight). The vehicle 84n may be within the field of view 74a'-74b' of one or more of the camera lenses 60a-60n. The apparatus 100 may perform the video analytics to determine the expected path of the vehicle 84n. If the vehicle 84n poses a collision hazard, the apparatus 100 may generate the control signal. For example, the control signal may activate the audio output device 54 to alert the driver of the vehicle 84n. In another example, the control signal may display a warning to the driver 68 to stop entering the intersection to avoid the potential collision with the vehicle 84n.

Figure 3:
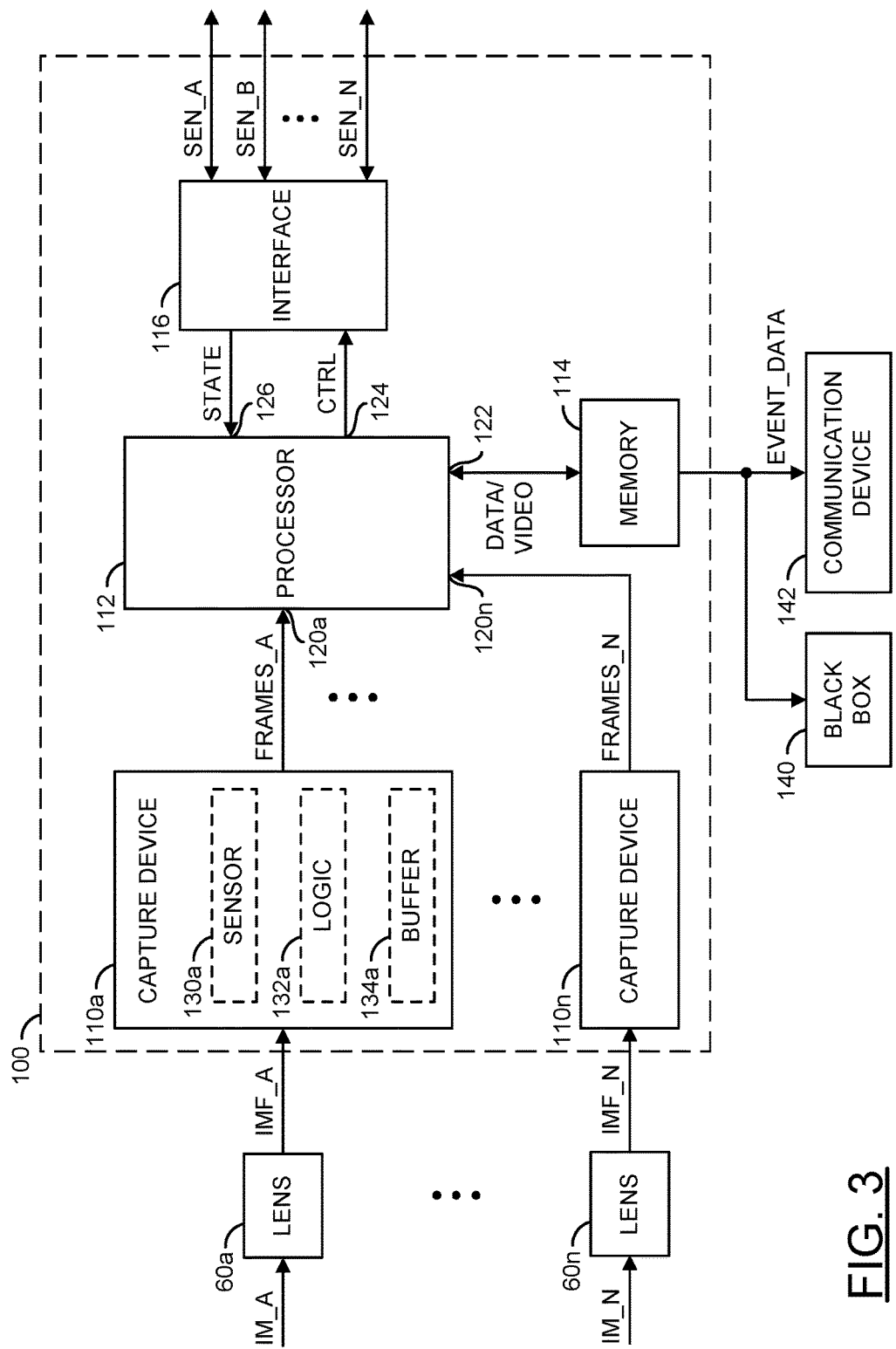
FIG. 3 is a block diagram illustrating an example embodiment of a system on chip for implementing a collision warning using video analytics.

Referring to FIG. 3, a block diagram illustrating an example embodiment of the apparatus 100 for implementing a collision warning using video analytics is shown. The apparatus 100 generally comprises blocks (or circuits) 110a-110n, a block (or circuit) 112, a block (or circuit) 114 and/or a block (or circuit) 116. The circuits 110a-110n may be implemented as capture devices. The circuit 112 may be implemented as a processor. In an example implementation, the circuit 112 may be implemented as a video processor. The processor 112 may comprise inputs 120a-120n, an input 122, an input 126 and/or other inputs. The processor 112 may comprise an output 124 and/or other outputs. The circuit 114 may be implemented as a memory. The circuit 116 may be implemented as an interface. The apparatus 100 may comprise other components (not shown). The apparatus 100 may be implemented as a system on chip.

The apparatus 100 may implement a camera system. In some embodiments, the camera system 100 may be implemented as a drop-in solution (e.g., installed as one component). In an example, the camera system 100 may be a device that may be installed as an after-market product for the vehicle 50 (e.g., a retro-fit for the vehicle 50). In some embodiments, the apparatus 100 may be a component of a camera. The number and/or types of signals and/or components implemented by the camera system 100 may be varied according to the design criteria of a particular implementation.

In the embodiment shown, the apparatus 100 is shown connected to a block (or circuit) 140 and/or a block (or circuit) 142. The circuit 140 may be a black box recorder. The circuit 142 may be a communication device. The black box recorder 140 may be configured to preserve a recent history of the components of the vehicle 50 through the recording of various parameters (e.g., collected several times per second). The black box recorder 140 may be configured to survive accidents and/or collisions. The black box recorder 140 may be implemented to preserve data for assisting in an investigation. The communication device 142 may be configured to enable communication with components outside of the vehicle 50.

In the embodiment shown, the capture devices 110a-110n may be components of the apparatus 100. In some embodiments, the capture devices 110a-110n may be separate devices (e.g., part of the vehicle 50 and/or part of a camera) configured to send data to the apparatus 100. Similarly, in some embodiments, the interface 116 may be implemented as a component external to the apparatus 100. For example, the interface 116 may be a component of the vehicle 50. In some embodiments, the apparatus 100 may be configured to read data in a format generated by the capture devices 110a-110n. In some embodiments, the processor 112 may be configured to generate a signal compatible with the interface 116. Similarly, in the example shown, the black box recorder 140 and the communication device 142 are shown as components external to the apparatus 100. However, in some embodiments, the black box recorder 140 and/or the communication device 142 may be implemented as components of the apparatus 100.

The apparatus 100 may receive one or more signals (e.g., IMF_A-IMF_N). The apparatus 100 may present one or more signals (e.g., SEN_A-SEN_N). The apparatus may present a signal (e.g., EVENT_DATA). The capture devices 110a-110n may receive the signals IMF_A-IMF_N from the corresponding lenses 60a-60n. The apparatus 100 may present one or more of the signals SEN_A-SEN_N to various components of the vehicle 50 (e.g., to generate the warning of the potential collision hazard). In some embodiments, the apparatus 100 may present the signal EVENT_DATA to the wireless communication device 142 (e.g., a radio-frequency (RF) transmitter, a Wi-Fi module, Bluetooth module and/or a device capable of other wireless communication protocols).

The lenses 60a-60n may capture signals (e.g., IM_A-IM_N). The signals IM_A-IM_N may be an image (e.g., an analog image) of the environment near (e.g., behind) the vehicle 50 (e.g., within the field of view 74a-74b) presented by the lenses 60a-60n to the capture devices 110a-110n as the signals IMF_A-IMF_N. The lenses 60a-60n may be implemented as an optical lens. The lenses 60a-60n may provide a zooming feature and/or a focusing feature. The capture devices 110a-110n and/or the lenses 60a-60n may be implemented, in one example, as a single lens assembly. In another example, the lenses 60a-60n may be a separate implementation from the capture devices 110a-110n. The capture devices 110a-110n are shown within the circuit 100. In an example implementation, the capture devices 110a-110n may be implemented outside of the circuit 100 (e.g., along with the lenses 60a-60n as part of a lens/capture device assembly separate from the apparatus 100).

The capture devices 110a-110n may be configured to capture image data for video (e.g., the signals IMF_A-IMF_N from the lenses 60a-60n). In some embodiments, the capture devices 110a-110n may be video capturing devices such as cameras. In some embodiments, the apparatus 100 may implement a single lens assembly (e.g., one lens 60a and one capture device 110a). The capture devices 110a-110n may capture data received through the lenses 60a-60n to generate bitstreams (e.g., generate video frames). For example, the capture devices 110a-110n may receive focused light from the lenses 60a-60n. The lenses 60a-60n may be directed, tilted, panned, zoomed and/or rotated to provide a targeted view from the vehicle 50 (e.g., to provide coverage for a view directed towards the rear of the vehicle). The capture devices 110a-110n may generate signals (e.g., FRAMES_A-FRAMES_N). The signals FRAMES_A-FRAMES_N may be video data (e.g., a sequence of video frames). The signals FRAMES_A-FRAMES_N may be presented to the inputs 120a-120n of the processor 112.

The capture devices 110a-110n may transform the received focused light signals IMF_A-IMF_N into digital data (e.g., bitstreams). In some embodiments, the capture devices 110a-110n may perform an analog to digital conversion. For example, the capture devices 110a-110n may perform a photoelectric conversion of the focused light received by the lenses 60a-60n. The capture devices 110a-110n may transform the bitstreams into video data, video files and/or video frames. In some embodiments, the video data generated by the capture devices 110a-110n may be uncompressed and/or raw data generated in response to the focused light from the lenses 60a-60n. In some embodiments, the video data may be digital video signals. The video signals may comprise video frames.

In some embodiments, the video data may be encoded at a high bitrate. For example, the signal may be generated using a lossless compression and/or with a low amount of lossiness. In some embodiments, the video data captured by the capture devices 110a-110n may be presented to the apparatus 100. The apparatus 100 may encode the video data captured by the capture devices 110a-110n to generate video data that may be output as a video signal (e.g., for the display device 58) and/or may be in a format compatible with performing video analytics.

In some embodiments, the apparatus 100 may further comprise an audio capture device (e.g., a microphone). The audio capture device may capture audio of the environment. The apparatus 100 may be configured to synchronize the audio captured with the images captured by the capture devices 110a-110n.

The processor 112 may receive the signals FRAMES_A-FRAMES_N from the capture devices 110a-110n at the inputs 120a-120n and/or a signal (e.g., DATA) from the memory 114 at the input 122. The processor 112 may be connected through a bi-directional interface (or connection) to components of the vehicle 50, the capture devices 110a-110n, the memory 114 and/or the interface 116. The processor 112 may store and/or retrieve data from the memory 114. The memory 114 may be configured to store computer readable/executable instructions (or firmware). The instructions, when executed by the processor 112 may perform a number of steps.

The processor 112 may be configured to receive the signals FRAMES_A-FRAMES_N, the signal DATA, and/or other inputs. The signal FRAMES_A-FRAMES_N may comprise video data (e.g., one or more video frames) providing the field of view 74a-74b captured by the lenses 60a-60n. The processor 112 may be configured to generate an output video signal and/or other signals (not shown). The output video signal may be generated based on one or more decisions made and/or functions performed by the processor 112. The decisions made and/or functions performed by the processor 112 may be determined based on data received by the processor 112 at the inputs 120a-120n (e.g., the signals FRAMES_A-FRAMES_N), the input 122, the input 126 and/or other inputs.

The inputs 120a-120n, the input 122, the output 124, the input 126 and/or other inputs/outputs may implement an interface. The interface may be implemented to transfer data to/from the processor 112, the capture devices 110a-110n, the memory 114, the interface 116 and/or other components of the apparatus 100 and/or the vehicle 50. In one example, the interface of the processor 112 may be configured to receive (e.g., via the inputs 120a-120n) the video streams FRAMES_A-FRAMES_N each from a respective one of the capture devices 110a-110n. In yet another example, the interface of the processor 112 may be configured to output one or more upcoming video frames (e.g., the output video) to the display device 58 and/or to the memory 114 (e.g., as the signal DATA). The interface of the processor 112 may be configured to enable a transfer of data and/or translation of data from one format to another format to ensure that the data transferred is readable by the intended destination component. In an example, the interface of the processor 112 may comprise a data bus, traces, connectors, wires and/or pins. The implementation of the interface of the processor 112 may be varied according to the design criteria of a particular implementation.

The output video may be presented to the memory 114 as the signal DATA. The output video may be an encoded, cropped, stitched and/or enhanced version of one or more of the signals FRAMES_A-FRAMES_N. The output video may be a high resolution, digital, encoded, de-warped, stabilized, cropped, blended, stitched and/or rolling shutter effect corrected version of the signals FRAMES_A-FRAMES_N. In some embodiments, the apparatus 100 may be configured to balance an amount of time needed to generate the output video with the visual quality of the output video. The signal DATA may further comprise metadata associated with the output video signal (e.g., a location, a timestamp, a severity of the collision hazard, a speed of the vehicles in the video, an acceleration of the vehicles in the video, etc.). The type and/or amount of the metadata in the signal DATA may be varied according to the design criteria of a particular implementation.

The video data of the targeted view from the perspective of the rear of the vehicle 50 may be represented as the signals/bitstreams/data FRAMES_A-FRAMES_N (e.g., video signals). The capture devices 110a-110n may present the signals FRAMES_A-FRAMES_N to the inputs 120a-120n of the processor 112. The signals FRAMES_A-FRAMES_N may represent the video frames/video data. The signals FRAMES_A-FRAMES_N may be video streams captured by the capture devices 110a-110n. In some embodiments, the capture devices 110a-110n may be implemented in a camera. In some embodiments, the capture devices 110a-110n may be configured to add to existing functionality to a camera.

Each of the capture devices 110a-110n may comprise a block (or circuit) 130, a block (or circuit) 132, and/or a block (or circuit) 134. The circuit 130 may implement a camera sensor (e.g., a complementary metal-oxide-semiconductor (CMOS) sensor). The circuit 132 may implement a camera processor/logic. The circuit 134 may implement a memory buffer. As a representative example, the capture device 110a is shown comprising the sensor 130a, the logic block 132a and the buffer 134a. The camera sensors 130a-130n may receive light from the corresponding one of the lenses 60a-60n and transform the light into digital data (e.g., the bitstreams).

In one example, the sensor 130a of the capture device 110a may receive light from the lens 60a. The camera sensor 130a of the capture device 110a may perform a photoelectric conversion of the light from the lens 60a. In some embodiments, the sensor 130a may be an oversampled binary image sensor. The logic 132a may transform the bitstream into a human-legible content (e.g., video data with visual content). The video analytics implemented by the processor 112 may be performed on the video data in a format that is human-legible (e.g., the visual content of the video data). For example, the logic 132a may receive pure (e.g., raw) data from the camera sensor 130a and generate video data based on the raw data (e.g., the bitstream). The memory buffer 134a may store the raw data and/or the processed bitstream. For example, the frame memory and/or buffer 134a may store (e.g., provide temporary storage and/or cache) one or more of the video frames (e.g., the video signal).

The processor 112 may be configured to execute computer readable code and/or process information. The processor 112 may be configured to receive input and/or present output to the memory 114 and/or the interface 116. The processor 112 may be configured to present and/or receive other signals (not shown). The number and/or types of inputs and/or outputs of the processor 112 may be varied according to the design criteria of a particular implementation.

The processor 112 may receive the signals FRAMES_A-FRAMES_N and/or the signal DATA. The processor 112 may make a decision based on data received at the inputs 120a-120n, the input 122, the input 126 and/or other input. For example other inputs may comprise external signals generated in response to user input, external signals generated by the vehicle 50 and/or internally generated signals such as signals generated by the processor 112 in response to analysis of the signals FRAMES_A-FRAMES_N and/or objects detected in the signals FRAMES_A-FRAMES_N. The processor 112 may adjust the video data (e.g., crop, digitally move, physically move the camera sensor 130, etc.) of the signals FRAMES_A-FRAMES_N.

The video analytics performed by the processor 112 may comprise analyzing, understanding and/or interpreting digital video to produce numerical and/or symbolic information about the digital video. The numerical and/or symbolic information may be used for interpreting visual information of the digital video. In an example, the intelligent video analytics may comprise computer vision.

In some embodiments, the processor 112 may be configured to extract data (e.g., the numerical and/or symbolic information) from the video frames. The extracted data may be used to determine the visual content of the video frames. Determining the visual content may comprise recognizing objects. In one example, the processor 112 may interpret the numerical and/or symbolic information to recognize that the visual data represents a vehicle. In some embodiments, the number of pixels and/or the colors of the pixels of the video data may be used to recognize portions of the video data as objects. The types of objects recognized by the processor 112 may be varied according to the design criteria of a particular implementation.

The processor 112 may generate a signal (e.g., CTRL) in response data received by the inputs 120a-120n, the input 122 and/or the input 126 and/or the decisions made in response to the data received by the inputs 120a-120n, the input 122 and/or the input 126. The signal CTRL may be generated in response to the video analytics performed by the processor 112.

The signal CTRL may be generated to provide a control signal for the interface 116 in response to the captured video frames (e.g., the signal FRAMES_A-FRAMES_N) and the video analytics performed by the processor 112. For example, the video analytics may be performed by the processor 112 in real-time and/or near real-time (e.g., with minimal delay). For example, the output video may be a live (or nearly live) video stream.

The processor 112 may receive a signal (e.g., STATE) from the interface 116 at the input 126. The signal STATE may comprise information corresponding to state data of the vehicle 50. In an example, the state data of the vehicle 50 may comprise speed, tire pressure, whether the tail lights 62a-62n are functional, brake fluid pressure, etc. The information in the signal STATE may be presented to the memory 114 with the signal DATA.

Generally, the video data presented to the memory 114 as the signal DATA may correspond to the data received at the inputs 120a-120n, the input 122, the input 126 and/or enhanced (e.g., stabilized, corrected, cropped, downscaled, packetized, compressed, etc.) by the processor 112. For example, the signal DATA may comprise video data that may be stitched, corrected, stabilized, cropped and/or encoded version of the signals FRAMES_A-FRAMES_N. The processor 112 may further encode and/or compress the signals FRAMES_A-FRAMES_N to generate the signal DATA.

The lenses 60a-60n (e.g., camera lenses) may be directed to provide a view from the perspective of the vehicle 50. The lenses 60a-60n may be aimed to capture environmental data (e.g., light). The lens 60a-60n may be configured to capture and/or focus the light for the capture devices 110a-110n. Generally, the camera sensor 130 is located behind each of the lenses 60a-60n. Based on the captured light from the lenses 60a-60n, the capture devices 110a-110n may generate a bitstream and/or video data.

Embodiments of the apparatus 100 may perform video stitching operations on the signals FRAMES_A-FRAMES_N. In one example, each of the video signals FRAMES_A-FRAMES_N may provide a portion of a panoramic view and the processor 112 may crop, blend, synchronize and/or align the signals FRAMES_A-FRAMES_N to generate the panoramic video signal. In some embodiments, the processor 112 may be configured to perform electronic image stabilization (EIS). The processor 112 may perform de-warping on the signals FRAMES_A-FRAMES_N. The processor 112 may perform intelligent video analytics on the de-warped video frames FRAMES_A-FRAMES_N. The processor 112 may encode the signals FRAMES_A-FRAMES_N to a particular format.

The encoded video may be stored locally and/or transmitted wirelessly to external storage (e.g., network attached storage, cloud storage, etc.). In an example, the encoded video may be stored locally by the memory 114. In another example, the encoded video may be stored to a hard-drive of a networked computing device. In yet another example, the encoded video may be transmitted wirelessly without storage. The type of storage implemented may be varied according to the design criteria of a particular implementation.

The cropping, downscaling, blending, stabilization, packetization, encoding, compression and/or conversion performed by the processor 112 may be varied according to the design criteria of a particular implementation. For example, the signal DATA may comprise a processed version of the signals FRAMES_A-FRAMES_N configured to fit the target area to the shape and/or specifications of the display device 58 and/or associated metadata. For example, the display device 58 may be implemented for real-time video streaming of the video data of the signal DATA received from the apparatus 100.

Generally, the signal DATA may comprise some view (or derivative of some view) captured by the capture devices 110a-110n. In some embodiments, the signal DATA may comprise a portion of a panoramic video captured by the capture devices 110a-110n. The signal DATA may be a video frame comprising the region of interest selected and/or cropped from a panoramic video frame by the processor 112. The signal DATA may have a smaller size than the panoramic video frames FRAMES_A-FRAMES_N. In some embodiments, the signal DATA may provide a series of cropped and/or enhanced panoramic video frames that improves upon the view captured by the lenses 60a-60n (e.g., provides night vision, provides High Dynamic Range (HDR) imaging, provides more viewing area, highlights detected objects, provides additional data such as a numerical distance to detected objects, provides visual indicators for expected paths, etc.). The video frames and/or the associated metadata stored in the memory 114 may be output by the apparatus 100 as the signal EVENT_DATA.

The memory 114 may store data. The memory 114 may be implemented as a cache, flash memory, DRAM memory, etc. The type and/or size of the memory 114 may be varied according to the design criteria of a particular implementation. The data stored in the memory 114 may correspond to a video file, status information (e.g., readings from the components of the vehicle 50, pre-selected fields of view, user preferences, user inputs, etc.) and/or metadata information.

The interface 116 may send and/or receive data to/from the apparatus 100. In some embodiments, the interface 116 may be implemented as a wireless communications module. In one example, the interface 116 may be a hard-wired data port (e.g., a USB port, a mini-USB port, a USB-C connector, HDMI port, an Ethernet port, a DisplayPort interface, a Lightning port, etc.). In another example, the interface 116 may be a wireless data interface (e.g., Wi-Fi, Bluetooth, ZigBee, cellular, etc.).

The interface 116 may be configured to receive the signal CTRL from the processor 112. The interface 116 may present one or more of the signals SEN_A-SEN_N to one or more components of the vehicle 50 (e.g., the tail lights 62s-62c, the display device 58, the audio output device 54, etc.). The interface 116 may convert the signal CTRL, generated by the processor 112, to a format compatible with the various components of the vehicle 50.

The interface 116 may be configured to receive one or more of the signals SEN_A-SEN_N. The signals SEN_A-SEN_N may be received from the various components of the vehicle 50. The signals SEN_A-SEN_N may comprise state data of the vehicle 50. The interface 116 may present the signal STATE to the processor 112 in response to the state data.

The processor 112 may generate the signal CTRL, in response to the video analytics performed by the processor 112 on the video frames (e.g., the signals FRAMES_A-FRAMES_N). The processor 112 may determine an appropriate response. In one example, if the video analytics do not detect a collision hazard, the appropriate response may be to do nothing (e.g., the processor 112 may not generate the signal CTRL). In another example, if the video analytics do detect a collision hazard, the appropriate response may be determined based on factors detected by the video analytics. For example, the expected path (e.g., speed and/or acceleration) of the approaching vehicle 84a may be a factor.

The appropriate response determined by the processor 112 may be provided to the interface 116 in the signal CTRL. In one example, the appropriate response may be to activate the tail lights 62a-62n. In another example, the appropriate response may be to sound an alert using the audio output device 54. The interface 116 may be configured to convert the appropriate response from the signal CTRL to a format compatible with the various components of the vehicle 50. In one example, the signal SEN_A may be presented to the tail lights 62a-62n and the data in the signal SEN_A may be configured to blink the tail lights 62a-62n at a particular intensity and/or frequency. In another example, the signal SEN_B may be presented to the audio output device 54 and the data in the signal SEN_B may be configured to activate a particular tone from the audio output device 54. In yet another example, the signal SEN_C may be connected to the display device 58, and the data in the signal SEN_C may be configured to display the warning on the display device 58. The connections to various components by the signals SEN_A-SEN_N and/or the data carried by the signals SEN_A-SEN_N may be varied according to the design criteria of a particular implementation.

In some embodiments, the apparatus 100 may be implemented as part of a larger system that collects traffic and/or safety data. For example, many vehicles may be equipped with the apparatus 100 in order to generate a large data set. The apparatus 100 may be configured to communicate data wirelessly or otherwise. In one example, the apparatus 100 may be configured to communicate wirelessly. In another example, the apparatus 100 may provide output from the memory 114 (e.g., a wired connection). The wired output from the apparatus 100 may be communicated using the communication device 142 implemented by the vehicle 50 (e.g., Wi-Fi, satellite communication, Bluetooth, 3G, 4G/LTE, 5G, etc.).

The apparatus 100 may generate information about a detected event and/or the severity of the event (e.g., the signal EVENT_DATA). For example, the event may be a collision and/or a near miss. The information about the detected event (e.g., the signal EVENT_DATA) may comprise the video data generated by the processor 112 from the signals FRAMES_A-FRAMES_N. The information about the detected event (e.g., the signal EVENT_DATA) may comprise metadata such as a location, a time-of-day, detected weather conditions, speed of the vehicles, acceleration of the vehicles, etc. The information about the detected event (e.g., the signal EVENT_DATA) may comprise the state data from the vehicle 50 (e.g., information in the signal STATE).

The signal EVENT_DATA may be presented to the black box recorder 140 and/or the communication device 142. In an example, the signal EVENT_DATA may be stored by the black box recorder 140 and may be recovered at the scene of an accident (e.g., for police investigation and/or insurance claims investigation). The data stored in the black box recorder 140 may be recovered in a scenario where the vehicle 50 and/or the communication device 142 is destroyed before transmission of the signal EVENT_DATA could occur. The information recorded by the black box recorder 140 and/or communicated by the communication device 142 may be used by police to determine fault and/or provide more detail about the event (e.g., collision) in an event post mortem. The signal EVENT_DATA may be communicated (e.g., uploaded) to a central database. Statistical analysis may be performed on the aggregated data from the events. The statistical analysis may be used to evaluate road safety. For example, the events may be used by civil and/or highway engineers to make safety improvements based on information in the signal EVENT_DATA.

Figure 4:
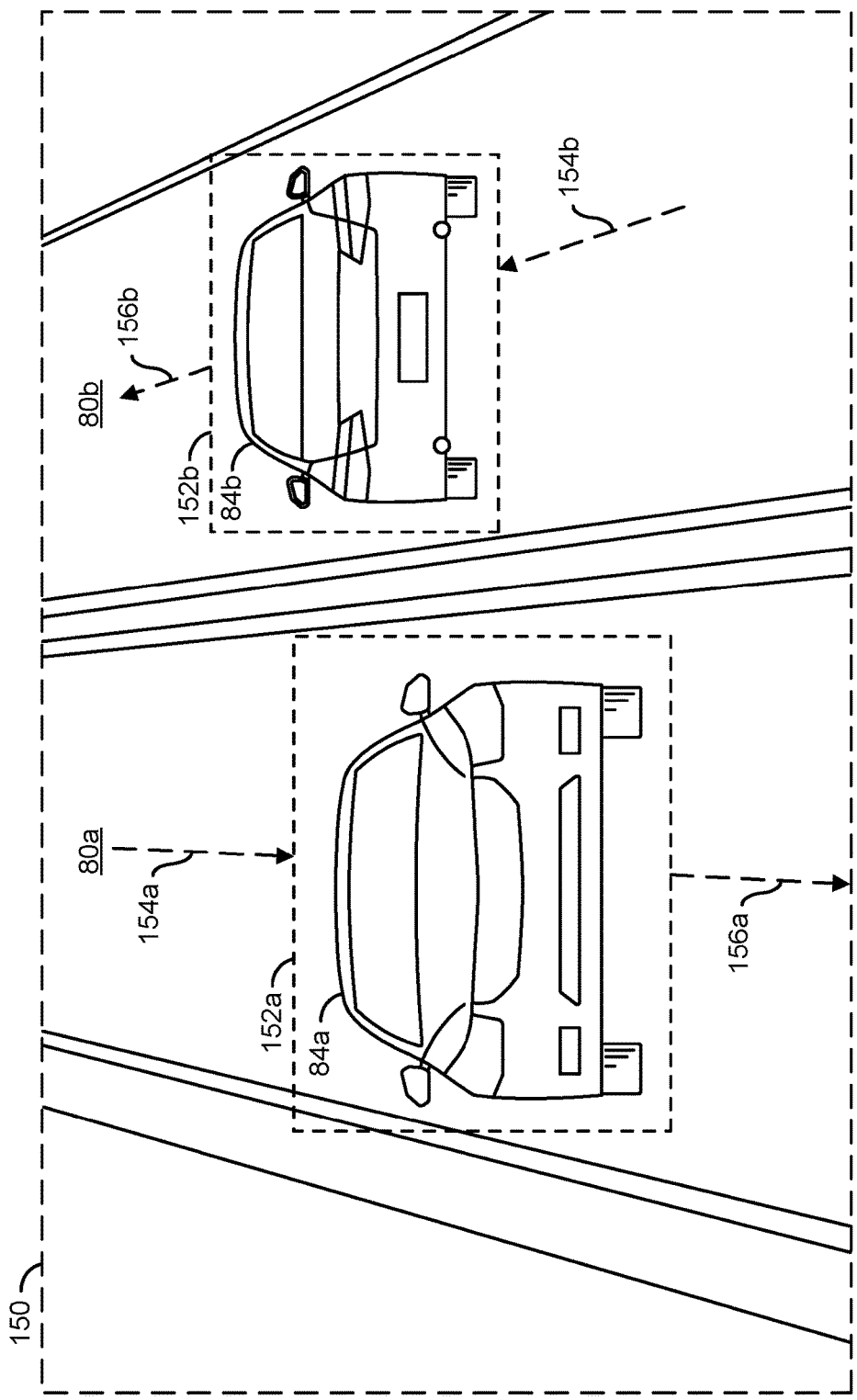
FIG. 4 is a diagram illustrating an example video frame analyzed using video analytics.

Referring to FIG. 4, a diagram illustrating an example video frame 150 analyzed using video analytics is shown. The video frame 150 may be one of the video frames FRAMES_A-FRAMES_N. In an example, the video frame 150 may be an example of video data captured within the field of view 74a-74b of one of the lenses 60a-60n. In the example shown, the video frame 150 may be a view from the perspective of the rear of the vehicle 50 (e.g., capturing a view looking behind the vehicle 50). The video frame 150 may be a representation of visual data captured by the sensor 130a and/or analyzed by the processor 112.

The video frame 150 may capture a section of the lane 80a and/or a section of the lane 80b. The video data captured in the video frame 150 may comprise the approaching vehicle 84a. The video data captured in the video frame 150 may comprise the vehicle 84b.

The processor 112 may be configured to perform video analytics on the visual data in the video frame 150. The video analytics may be configured to detect the vehicle 84a and/or the vehicle 84b as objects. A box 152a is shown around the vehicle 84a. A box 152b is shown around the vehicle 84b. The box 152a may represent the processor 112 identifying the vehicle 84a as an object in the visual data of the video frame 150. The box 152b may represent the processor 112 identifying the vehicle 84b as an object in the visual data of the video frame 150. In the example shown, objects 152a-152b are shown. However, other objects (e.g., vehicles, pedestrians, animals, obstacles, obstructions, etc.) may be identified by the processor 112 (e.g., objects 152a-152n). The method for identifying the vehicles 84a-84b as objects in the visual data of the video frame 150 may be varied according to the design criteria of a particular implementation.

The video analytics performed by the processor 112 may be performed on more than one video frame. For example, the video frame 150 may be one video frame of a series (or sequence) of video frames analyzed by the processor 112. The video analytics may be performed on video frames captured temporally before and/or after the video frame 150. By performing the video analytics on many video frames (or portions of each of the many video frames), the processor 112 may determine an expected path of the detected objects 152a-152n.

In the video frame 150, an arrow 154a is shown pointing to the object 152a. Similarly, an arrow 154b is shown pointing to the object 152b. The arrow 154a may represent a previous path of the object 152a (e.g., determined using video analytics on video frames captured prior to the video frame 150). The arrow 154b may represent a previous path of the object 152b (determined using video analytics on video frames captured prior to the video frame 150). The previous paths 154a-154b may be used by the processor 112 to determine a current speed, direction and/or acceleration of the objects 152a-152b. The current speed, direction and/or acceleration of the objects 152a-152b may be used by the processor 112 to determine an expected path of the objects 152a-152b.

In the video frame 150, an arrow 156a is shown pointing away from the object 152a. Similarly, an arrow 156b is shown pointing away from the object 152b. The arrow 156a may represent an expected path of the object 152a determined by the processor 112 based on the video analytics. The arrow 156b may represent an expected path of the object 152b determined by the processor 112 based on the video analytics. The expected paths 156a-156b may be calculated by the processor 112 to determine a potential future speed, direction and/or acceleration of the objects 152a-152b. The potential future speed, direction and/or acceleration of the objects 152a-152b may be used by the processor 112 to determine whether one or more of the objects 152a-152b may pose a collision hazard with the vehicle 50.

In some embodiments, the video frame 150 may be used as a proxy to represent the location of the vehicle 50 with respect to the objects 152a-152b. Generally, the lenses 60a-60n may be attached to the vehicle 50 and if an object is determined to pose a collision hazard with one or more of the lenses 60a-60n, the object may collide with the vehicle 50. For example, if an object is approaching the video frame (e.g., getting larger in the video frame as time passes), the object may pose a collision hazard with the vehicle 50.

The expected path 156b is shown directed away from the perspective of the video frame 150. For example, the vehicle 84b may be in the oncoming lane 80b traveling away from the vehicle 50. In subsequent video frames, the object 152b may become smaller as the object 152b travels away from the capture location of the video frame 150. In the example shown, the expected path 156b may not pose a collision hazard with the vehicle 50. In an example with no collision hazard, the processor 112 may not generate the control signal to generate the warning.

The expected path 156a is shown directed towards the perspective of the video frame 150. For example, the vehicle 84a may be in the same lane 80a as the vehicle 50 and/or traveling approaching the vehicle 50. In subsequent video frames, the object 152a may become larger as the object 152a travels closer to the capture location of the video frame 150. In the example shown, the expected path 156a may pose a collision hazard with the vehicle 50. In an example with a potential collision hazard, the processor 112 may generate the control signal to generate the warning.

In some embodiments, the processor 112 may be configured to provide directional data from the expected path 156a-156b. For example, the control signal CTRL may be generated in response to the directional data determined using the video analytics. The directional data may be used to generate an appropriate warning. In an example, the warning lights 64a-64n may be directed towards the incoming vehicle (e.g., the vehicle 84a and/or the vehicle 84n) that poses the collision hazard. In another example, directional audio may be implemented using the audio output device 54. Using the directional data determined by the video analytics, the processor 112 may present the signal CTRL to enable the audio output device 54 to provide directional audio as the warning. The directional audio may be implemented to prevent and/or reduce the risk of distracting other drivers in the vicinity. For example, a general audio warning may cause vehicles that do not pose a collision hazard to take evasive actions (e.g., that could unintentionally cause a collision with vehicles and/or pedestrians). A directed warning may be used to reduce a likelihood that vehicles that do not pose a collision hazard may react to the warning.

Figure 5:
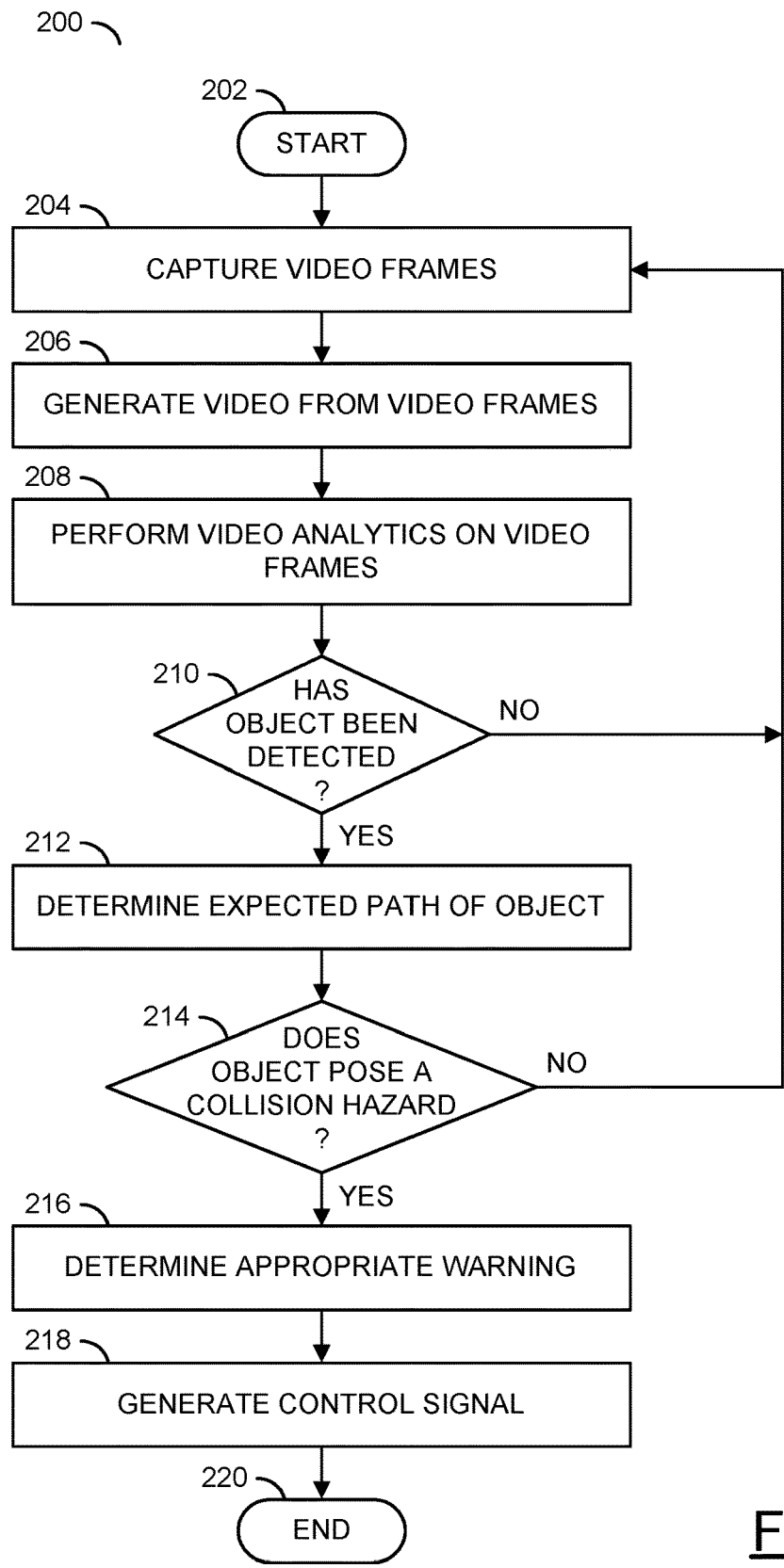
FIG. 5 is a flow diagram illustrating a method for generating a control signal in response to a detected object posing a collision hazard.

Referring to FIG. 5, a method (or process) 200 is shown. The method 200 may generate a control signal in response to a detected object posing a collision hazard. The method 200 generally comprises a step (or state) 202, a step (or state) 204, a step (or state) 206, a step (or state) 208, a decision step (or state) 210, a step (or state) 212, a decision step (or state) 214, a step (or state) 216, a step (or state) 218, and a step (or state) 220.

The state 202 may start the method 200. In the state 204, the lenses 60a-60n and/or the capture devices 110a-110n may capture the video frames FRAMES_A-FRAMES_N. The processor 112 may receive the signals FRAMES_A-FRAMES_N at the inputs 120a-120n. Next, in the state 206, the processor 112 may generate video data from the video frames. The video data may be used internally by the processor 112. In some embodiments, the video data may be presented to the display 58 and/or to the memory 114 as part of the signal DATA. In the state 208, the processor 112 may perform the video analytics on the video frames and/or the video data. Next, the method 200 may move to the decision state 210.

In the decision state 210, the processor 112 may determine whether an object (e.g., one or more of the objects 152a-152n) has been detected in the video frame (e.g., the video frame 150). If an object has not been detected, the method 200 may return to the state 204. If an object has been detected, the method 200 may move to the state 212. In the state 212, the processor 112 may determine the expected path of the object. For example, the processor 112 may determine the expected path 156a for the detected object 152a in the video frame 150 based on the video data in the signals FRAMES_A-FRAMES_N, the previous path 154a and/or a speed (or acceleration) of the vehicle 84a. Next, the method 200 may move to the decision state 214.

In the decision state 214, the processor 112 may determine whether the detected object poses a collision hazard. For example, the processor 112 may determine that the object 152a in the video frame 150 poses a collision hazard with the vehicle 50 based on the expected path 156a. If the object does not pose a collision hazard, the method 200 may return to the state 204. If the object does pose a collision hazard, the method 200 may move to the state 216. In the state 216, the processor 112 may determine the appropriate warning (e.g., the appropriate response). For example, the appropriate response may be to flicker the tail lights 62a-62n of the vehicle 50 to warn the driver piloting the approaching vehicle 84a. Next, in the state 218, the processor 112 may generate the control signal CTRL. The signal CTRL may be presented to the interface 116. Based on the signal CTRL, the interface 116 may generate one or more of the signals SEN_A-SEN_N to enable the appropriate warning. In an example, the signal SEN_I may be generated to flicker the tail lights 62a-62n. Next, the method 200 may move to the state 220. The state 220 may end the method 200.

Figure 6:
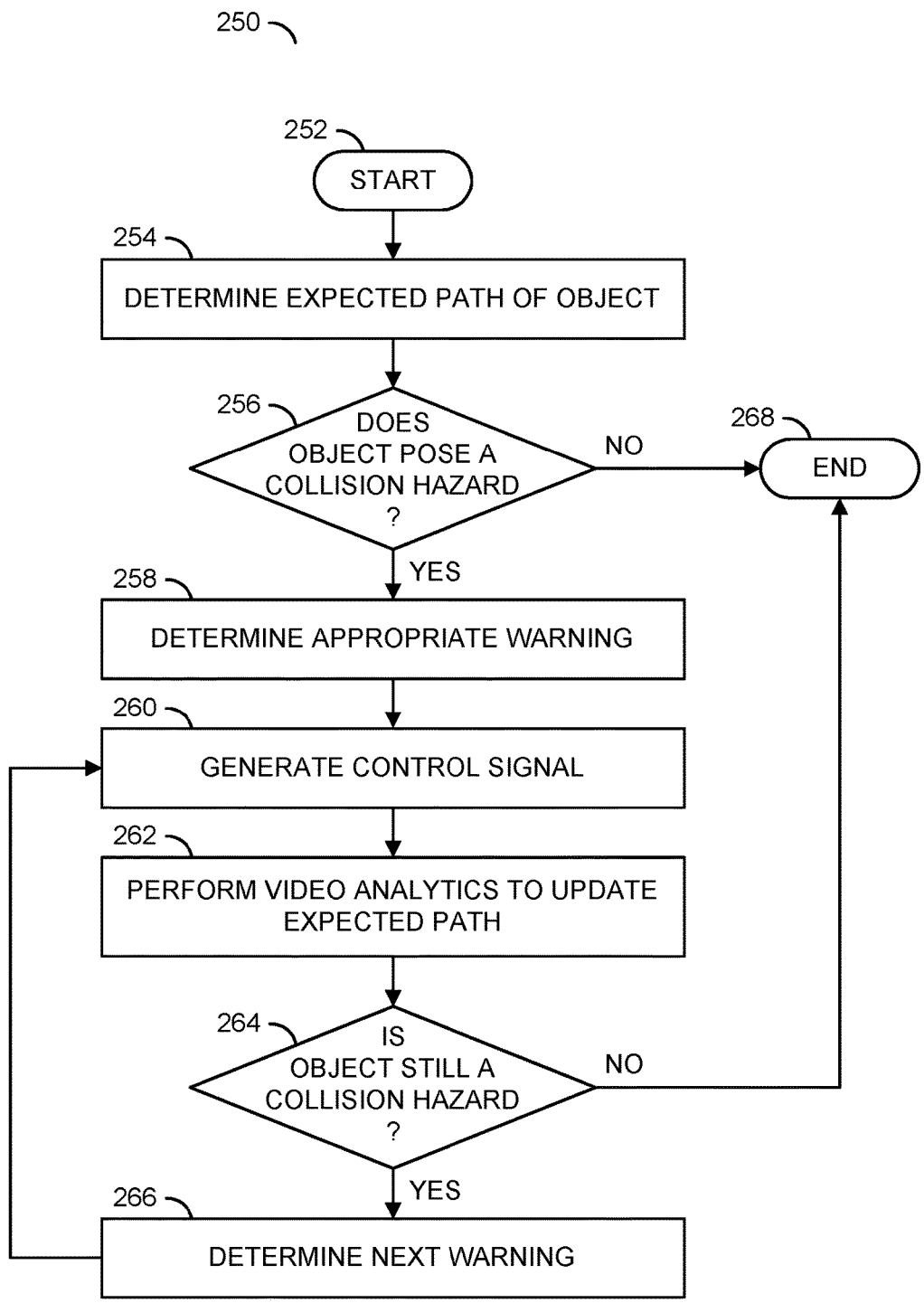
FIG. 6 is a flow diagram illustrating a method for implementing multiple warning types.

Referring to FIG. 6, a method (or process) 250 is shown. The method 250 may implement multiple warning types. The method 250 generally comprises a step (or state) 252, a step (or state) 254, a decision step (or state) 256, a step (or state) 258, a step (or state) 260, a step (or state) 262, a decision step (or state) 264, a step (or state) 266, and a step (or state) 268.

The state 252 may start the method 250. In the state 254, the processor 112 may determine the expected path of the detected object. For example, the processor 112 may determine the expected path 156a for the detected object 152a in the video frame 150 based on the video data in the signals FRAMES_A-FRAMES_N, the previous path 154a and/or a speed (or acceleration) of the vehicle 84a. Next, the method 250 may move to the decision state 256. In the decision state 256, the processor 112 may determine whether the detected object poses a collision hazard. For example, the processor 112 may determine that the object 152a in the video frame 150 poses a collision hazard with the vehicle 50 based on the expected path 156a. If the object does not pose a collision hazard, the method 250 may move to the state 268. If the object does pose a collision hazard, the method 250 may move to the state 258.

In the state 258, the processor 112 may determine the appropriate warning (e.g., the appropriate response). The appropriate response may be a first response (e.g., an initial warning). For example, the first response may be to flicker the tail lights 62a-62n of the vehicle 50 to warn the driver piloting the approaching vehicle 84a. Using a first response may be less intrusive and/or distracting to other drivers (e.g., to the vehicles 84b-84n) while still providing enough of a warning to the vehicle 84a to avoid the potential collision. Next, in the state 260, the processor 112 may generate the control signal CTRL. The signal CTRL may be presented to the interface 116. Based on the signal CTRL, the interface 116 may generate one or more of the signals SEN_A-SEN_N to enable the initial warning. In an example, the signal SEN_I may be generated to flicker the tail lights 62a-62n. Next, the method 250 may move to the decision state 262.

In the state 262, the processor 112 may perform video analytics on the video data to update the expected path. For example, processor 112 may perform video analytics on frames after the video frame 150 to determine an update to the expected path 156a (e.g., determine whether or not the detected object 152a has an altered path in response to the previous warning). Next, the method 250 may move to the decision state 264. In the decision state 264, the processor 112 may determine whether the object is still a collision hazard (e.g., based on the updated expected path). If the object is still a collision hazard, the method 250 may move to the state 266. In the state 266, the processor 112 may determine a next warning.

The next warning (or response) may be determined based on a response of the detected object to the previous warning and/or the urgency of the potential collision hazard. In an example, if the previous warning was flickering the tail lights 62a-62n, the next warning may be playing loud audio using the audio output device 54. In another example, if the urgency of the collision hazard is high (e.g., a collision is imminent), the next response may be to initiate an evasive action by the vehicle 50. The next response (or warning) may be generated in response to the signals SEN_A-SEN_N. The signals SEN_A-SEN_N may be generated in response to the signal CTRL received by the interface 116 from the processor 112.

In the decision state 264, if the object is not still a collision hazard, the method 250 may move to the state 268. For example, if the approaching vehicle 84a has altered the expected path 156a in response to the previous warning, the detected object 152a may no longer be a collision hazard. No additional warnings may be needed. The state 268 may end the method 250.

Figure 7:
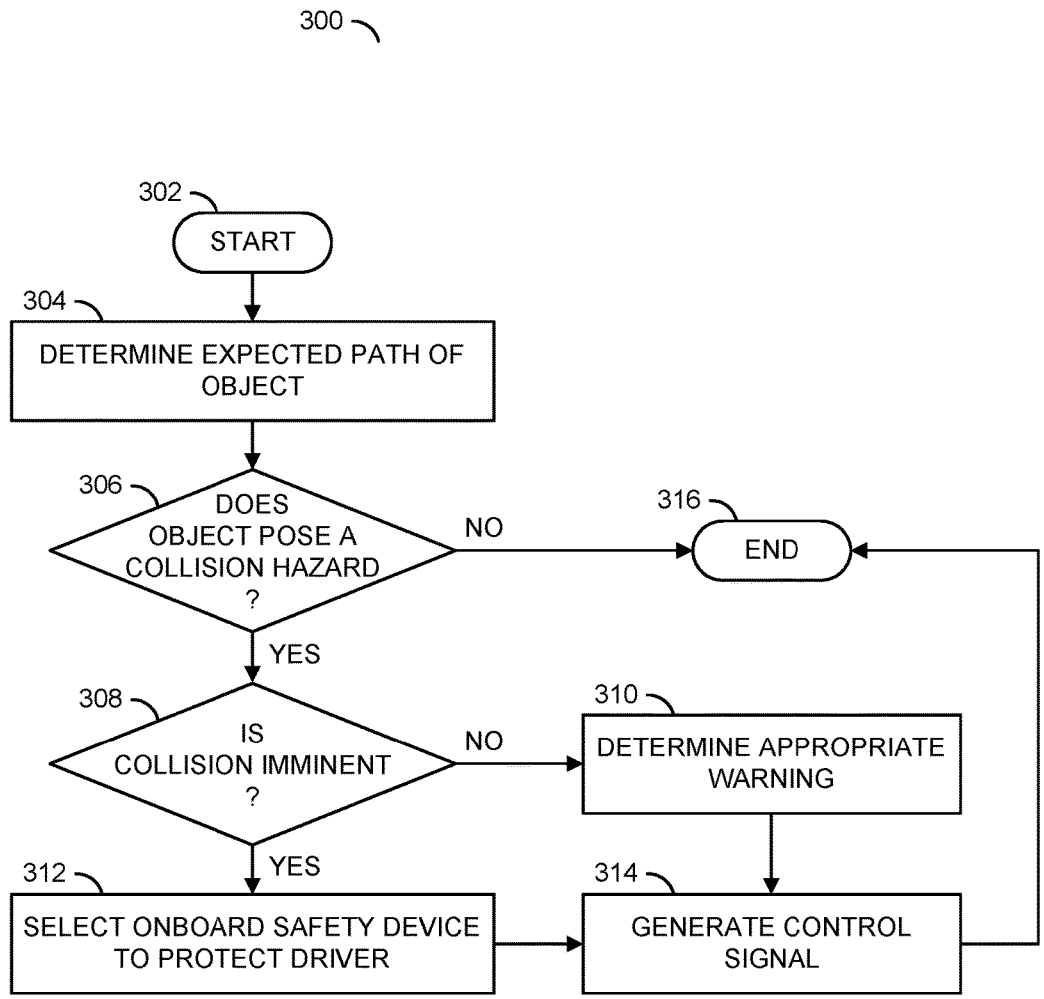
FIG. 7 is a flow diagram illustrating a method for activating safety measures in response to an imminent collision.

Referring to FIG. 7, a method (or process) 300 is shown. The method 300 may activate safety measures in response to an imminent collision. The method 300 generally comprises a step (or state) 302, a step (or state) 304, a decision step (or state) 306, a decision step (or state) 308, a step (or state) 310, a step (or state) 312, a step (or state) 314, and a step (or state) 316.

The state 302 may start the method 300. In the state 304, the processor 112 may determine the expected path of the detected object. For example, the processor 112 may determine the expected path 156a for the detected object 152a in the video frame 150 based on the video data in the signals FRAMES_A-FRAMES_N, the previous path 154a and/or a speed (or acceleration) of the vehicle 84a. Next, the method 300 may move to the decision state 306. In the decision state 306, the processor 112 may determine whether the detected object poses a collision hazard. For example, the processor 112 may determine that the object 152a in the video frame 150 poses a collision hazard with the vehicle 50 based on the expected path 156a. If the object does not pose a collision hazard, the method 300 may move to the state 316. If the object does pose a collision hazard, the method 300 may move to the decision state 308.

In the decision state 308, the processor 112 may determine whether a collision is imminent. For example, the processor 112 may perform the video analytics on the video frame 150 to determine the expected path 156a of the vehicle 84a. The expected path 156a may indicate that a crash with the vehicle 50 is unavoidable. For example, the vehicle 84a may be approaching the lens 60a at a high rate and/or the detected object 152a may appear large in the video frame 150 to indicate a collision. If the collision is not imminent, the method 300 may move to the state 310. In the state 310, the processor 112 may determine the appropriate warning. For example, for an expected path that does not indicate an imminent collision, the appropriate warning may be to flicker the tail lights 62a-62n. Next, the method 300 may move to the state 314. In the decision state 308, if the collision is imminent, the method 300 may move to the state 312. In the state 312, the processor 112 may select the onboard safety device 56 to protect the driver 68. For example, the onboard safety device 56 may be a seatbelt restraint system. Next, the method 300 may move to the state 314.

In the state 314, the processor 112 may generate the control signal CTRL. Next, the method 300 may move to the state 316. The state 316 may end the method 300.

Figure 8:
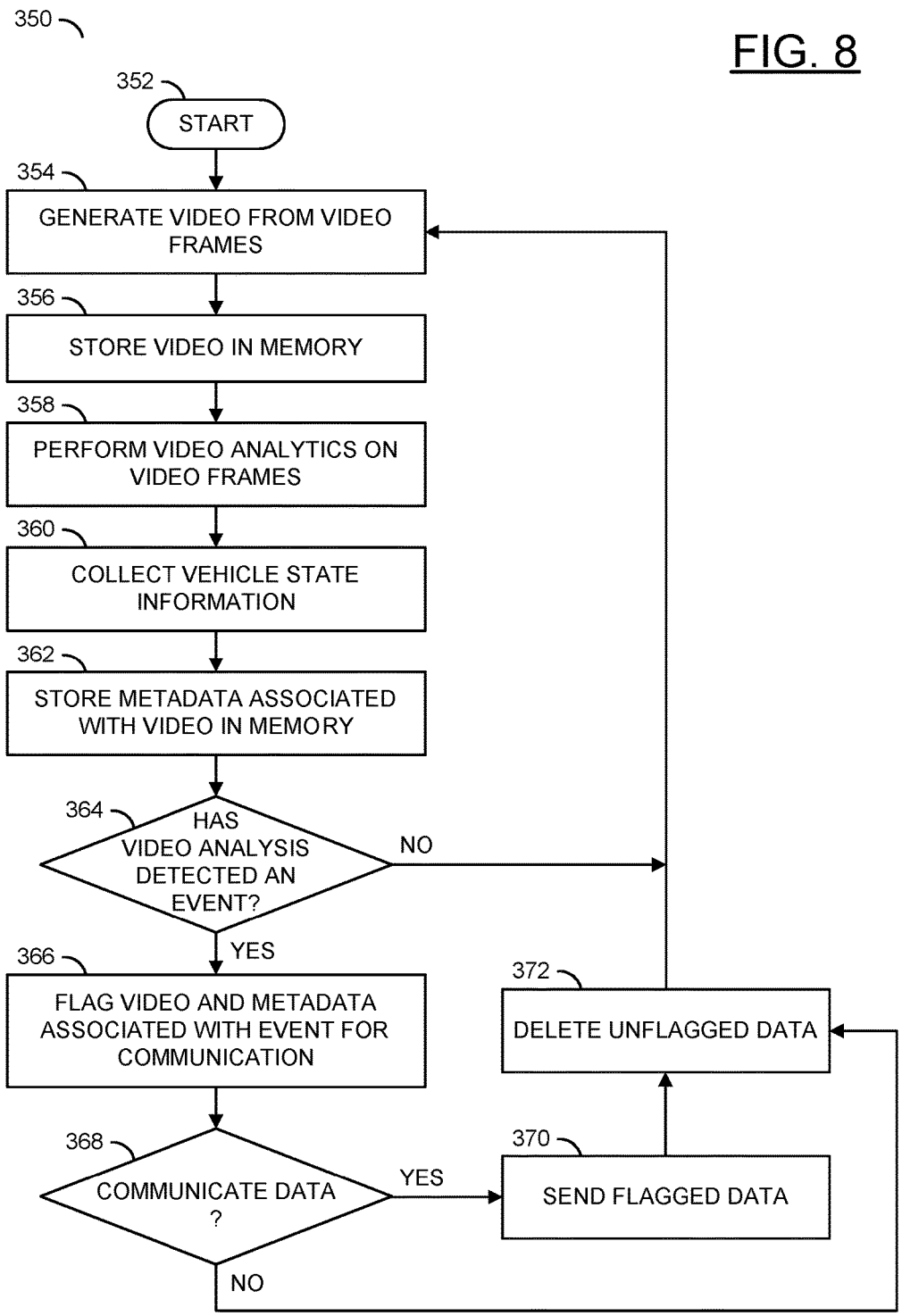
FIG. 8 is a flow diagram illustrating a method for collecting and communicating safety data using video analytics.

Referring to FIG. 8, a method (or process) 350 is shown. The method 350 may collect and communicate safety data using video analytics. The method 350 generally comprises a step (or state) 352, a step (or state) 354, a step (or state) 356, a step (or state) 358, a step (or state) 360, a step (or state) 362, a decision step (or state) 364, a step (or state) 366, a decision step (or state) 368, a step (or state) 370, and a step (or state) 372.

The state 352 may start the method 350. In the state 354, the processor 112 may generate video data from the video frames FRAMES_A-FRAMES_N. Next, in the state 356, the processor 112 may store the video data in the memory 114. For example, the video data may be transmitted as the signal DATA. In the state 358, the processor 112 may perform video analytics on the video frames FRAMES_A-FRAMES_N and/or the video data. In some embodiments, the video analytics may be performed as the video frames FRAMES_A-FRAMES_N are received. In some embodiments, the video data may be retrieved from the memory 114 by the processor 112. Next, in the state 360, the processor 112 may collect the vehicle state information. For example, the processor 112 may receive the signal STATE from the interface 116. The interface 116 may receive information from various components of the vehicle 50 from the signals SEN_A-SEN_N. In the state 362, the processor 112 may store metadata associated with the video in the memory 114. For example, the metadata may comprise location information, speed information, a timestamp, a vehicle identification number, a serial number for the camera, etc. The metadata may further comprise the vehicle state information. The metadata may be transmitted to the memory 114 as the signal DATA (e.g., along with the video data). Next, the method 350 may move to the decision state 364.

In the decision state 364, the processor 112 may determine whether the video analysis has detected an event. The event may be a collision, a near collision and/or a particular scenario (e.g., parking, unloading cargo, traveling particular intersections, etc.). If an event has not been detected, the method 350 may return to the state 354. If an event has been detected, the method 350 may move to the state 366. In the state 366, the processor 112 and/or the memory 114 may flag the video and the metadata associated with the event for communication. Next, the method 350 may move to the decision state 368.

In the decision state 368, the apparatus 100 and/or the components of the vehicle 50 may determine whether to communicate the data. In some embodiments, the data may be communicated using the communication device 142 at particular times and/or time intervals. In some embodiments, the data may be communicated live (e.g., streamed as output as it is recorded). If the data is not to be communicated (e.g., the data is not flagged for communication), the method 350 may move to the state 372. If the data is to be communicated (e.g., the data is flagged for communication), the method 350 may move to the state 370. In the state 370, the memory 114 may send the flagged data to the black box recorder 140 and/or the communication device 142 (e.g., as the signal EVENT_DATA). Next, in the state 372, the memory 114 may delete the unflagged data (e.g., purge data to ensure the memory 114 has available storage for future events). Next, the method 350 may return to the state 354.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a sensor configured to capture video frames of an environment near a vehicle; and
a processor configured to (i) receive said video frames from said sensor, (ii) perform video analytics on said video frames and (iii) generate a control signal in response to said video analytics, wherein (a) said video analytics analyze visual content in said video frames to identify an object approaching said vehicle, (b) said video analytics determine (i) an expected path and (ii) an acceleration of said object approaching said vehicle, (c) said control signal is configured to generate a warning for said object approaching said vehicle if said expected path poses a collision hazard with said vehicle, and (d) said processor is configured to (i) perform said analytics on a plurality of said video frames to determine said expected path of said object, (ii) determine a plurality of said expected paths and (iii) said plurality of expected paths are used to determine said acceleration.

2. The apparatus according to claim 1, wherein said warning comprises generating a signal to blink a tail light system of said vehicle.

3. The apparatus according to claim 1, wherein said vehicle is at least one of (i) a slow-moving vehicle and (ii) a stationary vehicle.

4. The apparatus according to claim 1, wherein said warning comprises an audio output.

5. The apparatus according to claim 1, wherein (i) said warning is generated for a driver of said vehicle and (ii) said warning comprises a visual indication to said driver of said vehicle.

6. The apparatus according to claim 1, wherein said control signal is further configured to prepare a safety response of said vehicle.

7. The apparatus according to claim 1, wherein said expected path of said object determined by said video analytics comprises a rear end collision with said vehicle.

8. The apparatus according to claim 1, wherein determining said expected path comprises determining at least one of (i) said acceleration of said object and (ii) a speed of said object.

9. The apparatus according to claim 1, wherein said processor is configured to store data associated with said collision hazard.

10. The apparatus according to claim 9, wherein said apparatus is further configured to communicate said data associated with said collision hazard to an external service.

11. The apparatus according to claim 9, wherein said apparatus is further configured to communicate said data associated with said collision hazard to a black box recorder.

12. The apparatus according to claim 9, wherein said data associated with said collision hazard comprises said video frames and metadata.

13. The apparatus according to claim 9, wherein said data associated with said collision hazard comprises state information of said vehicle.

14. The apparatus according to claim 1, wherein (i) said object approaching said vehicle is a second vehicle and (ii) said second vehicle is approaching said vehicle from behind.

15. The apparatus according to claim 1, wherein said apparatus is configured to implement a rear collision alert system.

16. The apparatus according to claim 1, wherein said collision hazard detected in response to said expected path of said object determined by said video analytics comprises a side collision with said vehicle.

17. The apparatus according to claim 1, wherein (i) said expected path is used to determine a direction of said collision hazard and (ii) said warning is implemented towards said direction of said collision hazard.

18. The apparatus according to claim 17, wherein said warning implemented towards said direction of said collision hazard is implemented to reduce a risk of distracting vehicles that do not pose said collision hazard.

* * * * *